United States Patent Office 3,459,807
Patented Aug. 5, 1969

3,459,807
CATALYST FOR PREPARING FORMALDEHYDE FROM METHANOL
Giancarlo Aglietti, Pietro Baratella, Cesare Reni, and Luigi Lugo, Milan, Italy, assignors to Societa Italiana Resine S.p.A., Milan, Italy
No Drawing. Filed Nov. 18, 1966, Ser. No. 595,367
Claims priority, application Italy, June 4, 1966, 12,690/66
Int. Cl. B01j 11/84; C07c 47/04, 45/10
U.S. Cl. 260—603                    5 Claims

ABSTRACT OF THE DISCLOSURE

A method of preparing a catalyst of high specific area and high mechanical properties comprising mixing an ammonium heptamolybdate solution and a ferric chloride solution, reducing the amomnium ion content of the resulting precipitate to a value lower than 0.2% by washing, reducing the water content of the washed product to below 40% by squeezing and forming a product containing molybdenum and iron oxides in a molar ratio of between 10:1 and 5:1, heating said product to a temperature of less than 420° C. The catalyst so produced is useful in the oxidation of methanol to produce formaldehyde.

---

This invention relates to a catalyst useful in oxidizing methanol to formaldehyde, more particularly to an improved catalyst containing molybdenum and iron oxides and manufacture thereof.

Metal oxide containing catalysts for the synthesis of formaldehyde by oxidation of methanol have long been known in the art and are usually prepared from dilute solutions of molybdenum and iron salts in the form of complex salt precipitates which are dried and granulated after washing and filtering them. However, these catalyst strongly tend to disintegration, so that it was later preferred to prepare an ineffective catalyst precursor of mechanical properties such that it can be transported and charged to the reactors without excessive crumbling. Alternatively catalysts supported on nonmetal inert material are employed. Activation is then carried out in the methanol oxidation reactor by causing hot air to flow at 150–300° C., and is then actually pursued during use of the catalyst since the temperatures at the reaction zone amounted to about at least 400° C. with the unsupported catalyst.

With this procedure a gradual increase in time of the effectiveness of the catalyst is achieved as the oxidation reaction of methanol to formaldehyde proceeds.

However, these though highly effective catalysts still strongly tend to disintegrate, so that powders are formed which are the cause of pressure losses and decreased effectiveness, whereby the progress of the reaction is adversely affected. Later on an improvement in mechanical properties was obtained by preparing these catalysts by a special mechanical working in a plastic condition before activation.

However, it is known that mechanical working such as extrusion, rolling or the like result in an increased compactness of the solid mass, which decreases its specific area and consequently the effectiveness of the catalyst. However, the disadvantage of decreased effectiveness is made up for by the mechanical improvement through which the catalyst can be continuously used during several months in the synthesis of formaldehyde, whereby a total conversion yield per kg. catalyst is improved.

On the other hand, experts in the branch are well aware that these catalyst, especially if they are unsupported have properties substantially dependent upon the conditions under which they have been obtained, more particularly the chemical nature of the ions involved in the precipitating reaction, pH of the solution, precipitating temperature, rate of precipitation, exact method of precipitation, sequence of addition of the precipitating solutions, absolute concentration of the precipitating ions, relative concentration of the precipitating ions, filtering and washing techniques, drying and heat-treatment methods. These factors are apt to affect also the structure of the combine oxides and up to a certain extent the effectiveness of the catalyst as well.

It has now been found that a molybdenum and iron oxide-containing catalyst can be obtained, which is useful in oxidation of alcohol to aldehydes, more particularly of methanol to formaldehyde and combines a high mechanical strength with an extensive specific area, its effectiveness and selectivity being such as to afford a higher formaldehyde output than by any other above mentioned catalyst.

This catalyst, which is obtained by a sequence of operations including a special precipitation of the molybdenum and iron compounds and a special method of recovering the precipitated complex salts, can be formed without any mechanical processing, any support being moreover avoided by virtue of the high mechanical properties of the catalyst.

The main object of this invention is therefore to provide a simple and inexpensive method of preparing an unsupported molybdenum and iron-containing catalyst, useful in oxidation of methanol to formaldehyde, of an extensive area, hence of high effectiveness as well as selectivity and such as to afford a higher formaldehyde yield than any previously known catalyst of the same type when used under comparable reaction conditions.

A further object of this invention is to provide a method of preparing the said catalyst, which affords high mechanical properties thereof so that it can be transported and charged to the reactor without any damage, and is of low tendency to crumbling whereby a substantial formation of powders is avoided which would otherwise increase pressure losses and adversely affect in time the progress of the methanol oxidation reaction.

A further object of the invention consists in providing a method of preparing the said catalyst, which yields a product the high selectivity and effectiveness of which persist in time, so that it can be satisfactorily employed during several months for the synthesis of formaldehyde by oxidation of methanol.

Further objects of the invention will be obvious from the appended description and experimental examples.

The catalyst according to the invention is prepared by dissolving at room temperature while stirring heptamolybdate of ammonium in a concentrated hydrochloric solution till a clear solution is obtained.

The latter is then diluted by deionized water so that the concentration of ammonium heptamolybdate in the resulting solution ranges between 3 and 7% by weight.

The feed molar ratio of the acid and molybdic salt ranges between 12:1 and 18:1, preferably 15:1 and 16:1. The molybdic salt solution is now admixed with ferric chloride solution by a quantity such that the molar ratio $MoO_3/Fe_2O_3$ in the final catalyst ranges between 10:1 and 5:1, preferably 7.5:1 and 6.0:1.

The molybdic salt solution of a pH below 1 is gradually admixed, while stirring, during a time shorter than 2 hours with the aqueous solution of the ferric salt of a concentration ranging between 2 and 5% by weight.

The whole is then heated to a temperature ranging between 45 and 55° C. and allowed to stand during some hours, the pH of the solution being finally adjusted to a value of about 1 by means of aqueous ammonia.

The precipitate is subsequently repeatedly washed at room temperature by means of deionized water down to an ammonium ion content in the washing water below 0.2% by weight. At this stage the precipitate is filtered under a slight vacuum and a product is obtained which is squeezed at pressures of 300 to 350 kg./sq. cm. to reduce its water content to an amount ranging between 30 and 40%, preferably 35 and 38% by weight.

The resulting panel, which is a compact solid mass is then crushed to granules of an irregular shape, which are sieved on a 5.5 mm. mesh wire gauze in order to separate the pulverized fraction and dried during about 30 hours at a gradually rising temperature up to a maximum of 100° C.

The still unfinished catalyst is now of a sufficient mechanical strength for transport and charging to the utilizing reactor without risk of crumbling.

Finally, the catalyst is calcined in the utilizing reactor by admitting air at a rate of about 1 liter per cm. catalyst/ hour at a gradually increasing temperature between 300 and 400° C. The treatment is pursued till no steam is contained in the reactor outlet gases.

The calcination which implies a loss of about 10% by weight in catalyst can be effected, as an alternative, outside the utilizing reactor, during periods of 20 to 25 hours when the temperature is gradually raised up to a maximum of 410–420° C.

The latter treatment is preferred under a practical aspect, though no substantial difference in effectiveness is ascertained between the catalysts calcined by the two methods, respectively.

The resulting catalyst is utilized, as mentioned above, in oxidizing alcohols to aldehydes and was found to be particularly useful in the oxidation of methanol to formaldehyde. The catalytic oxidation reactions of the alcohols are performed in tubular reactors.

The invention shall be further explained by experimental examples which will further clear the scope thereof without, however, imposing any limitation.

EXAMPLE 1

2.04 kg. heptamolybdate of ammonium, with a 81.5% $MoO_3$ content are dissolved in 2.71 kg. 31.9% HCl. After stirring in the cold to a clear state 1.48 kg. $FeCl_3.6H_2O$ dissolved in 3.2 litres water are added during 30 minutes while stirring. A precipitate is formed. The whole is heated to about 50° C., stirring is stopped and the whole is allowed to stand during 2 hours. The pH is adjusted to 1.1 by means of a 30% ammonia solution which is added to the solution while stirring. After decantation, the aqueous layer is discharged and washing is carried out by means of 2.5 litres deionized water. The treatment is repeated six times, decanting and discharging the aqueous layer every time. The ammonium ion in the aqueous layer is thereby reduced to less than 0.2%.

After filtering on a Buchner in vacuum the panel is pressed in a small hydraulic press at a pressure of 350 kg./sq. cm. The water residue in the panel is thereby reduced to about 37% by weight.

The panel from the press is crushed by means of a hammer and sieved on a 5.5 mm. mesh sieve.

The granulate is dried in a wind cupboard drier and is left during about 8 hours at room temperature, whereafter the temperature is adjusted to maintain the product at 40° C. during five hours, 60° C. during 8 hours and 95 to 100° C. during about 10 hours.

Calcination is then carried out in a muffle furnace, the granulate being maintained at 200° C. during 2 hours, 250° C. during 1 hour, 300° C. during 14 hours, finally 420° C. during 6 hours.

Including the fraction pulverized during granulation of the catalyst, which is re-utilized in subsequent synthesis processes, 1.62 kg. finished catalyst are obtained, of the composition $MoO_3$ 84%, $Fe_2O_3$ 16% by weight.

The specific area of the catalyst measured by the B.E.T. method was found to be 4 m.²/g.

EXAMPLE 2

80 cc. catalyst, prepared in accordance with Example 1, are placed into a tubular reactor of stainless steel 15 mm. in diameter provided with an outer jacket for oil circulation in order to maintain the temperature in the reactor within the desired range.

The oxidizing gas of a composition by volume of 10% oxygen and 90% nitrogen approximately, obtained by feeding equal nitrogen and air volumes, is pre-heated to 180–190° C., the methanol fed past the heated gas being vaporized by said gas and the mixture being conveyed to the oxidation reactor. In the latter the temperatures of the fluid circulating in the jacket are maintained at values such that on equilibrium the temperature of the reacted gases at their issue from the reactor amounts to about 310° C.

The reaction gases are scrubbed with water in a column filled with Raschig rings. Analytical determinations are then carried out on the aqueous solution. 800 N litres/ hour of the described oxidizing gas are fed together with 80 gm./hours 100% methanol, the alcohol being measured by means of a suitable measuring pump.

The reaction conditions are adjusted as described above and the process is carried out during about 200 hours.

During subsequent 100 hours the reaction outputs are checked. As an average 69 gm./hours formaldehyde are obtained with a molar output of 92% methanol to formaldehyde and a production equalling 862 g. 100% formaldehyde/litres catalyst/hours.

EXAMPLE 3

By employing the catalsyt described in Example 1 and conditions and apparatus described in Example 2, 640 N litres per hour oxidizing gaseous mixture are fed to the oxidation reactor together with 64 grams per hour 100% methanol. As an average 56 g. 100% formaldehyde are obtained with a molar output of 93% methanol to formaldehyde and a production equalling 700 g. 100% formaldehyde/litres catalyst/hours.

The determination of the side products or unaltered product in the formaldehyde scrubbing aqueous solution showed that less than 0.015 part formic acid and about 1.8 parts methanol are present to 100 parts formaldehyde.

EXAMPLE 4

A fresh quantity of catalyst is prepared by the method described in Example 1 up to the drying step, whereupon the non-calcined product is charged to the methanol oxidation reactor described in Example 2, and air is caused to flow at increasing temperatures between 300° and 400° C. till no steam is any longer present in the outlet gases.

The specific area determined on a sample of the catalyst obtained amounted to 3.7 cm./gm.

Under the conditions and with the apparatus described in Example 2, 640 N litres per hour oxidizing gaseous mixture are fed to the oxidation reactor together with 64 grams per hour 100% methanol.

As an average 55.5 g. 100% formaldehyde are obtained with a molar output of 92.5% methanol to formaldehyde and a production equalling 694 g. 100% formaldehyde/ litres catalyst/hours.

EXAMPLE 5

The catalyst prepared as described in Example 1 was utilized in a tube bundle pilot plant equipped with a part recycling of exhausted reaction gases, pre-heaters for the reacting gases, cooling arrangement for the reacted gases, carburetor in which the methanol supplied thereto by a measuring pump is vaporized and scrubbing column employing water from the reaction products.

The stainless steel tube bundle reactor comprises 285 tubes 12 mm. in diameter and 1050 mm. length, each containing 85 cc. catalyst, the tubes plunging in oil circulated by the pump.

The oxidizing gaseous mixture comprising about 20% air by volume, the balance being recycled gases, and (100%) methanol are supplied at a rate of 195 N cm./hours and 19.5 kg./hours, respectively, to the reactor after pre-heating to a temperature of about 250 to 255° C.

The temperature of the circulating oil is maintained such that the reacted gases are at a temperature ranging between 290 and 300° C. past the heat exchanger by which the reaction gas temperature is lowered before scrubbing with water. During six months run the pressure loss in the tubes rose from 180 to about 300 mm. Hg.

During this period the hourly average production amounted to 17 kg./hours 100% formaldehyde. In this manner the mole percent conversion of methanol to formaldehyde amounts to about 93%.

Analytic determinations showed that the formic acid content was lower than 0.02 part to 100 parts 100% formaldehyde.

What we claim is:

1. A process for the preparation of a high specific surface and high mechanical strength catalyst useful for converting methanol into formaldehyde which consists essentially of molybdenum oxide and iron oxide in a molar ratio of $MoO_3/Fe_2O_3$ from 10:1 to 5:1 which process comprises:
   (a) gradually adding an aqueous solution containing from 2% to 5% by weight of ferric chloride to a stirred aqueous acid solution containing 3% to 7% by weight of ammonium heptamolybdate and sufficient acid to provide an acid/ammonium heptamolybdate molar ratio of from 15:1 to 16:1, so as to obtain a solid suspension;
   (b) heating the resulting suspension to a temperature of between 45° C. and 55° C.;
   (c) adjusting the pH of said suspension to about pH 1 by means of aqueous ammonia;
   (d) washing with water until the ammonia ion content in the wash water is below 0.2% by weight;
   (e) reducing the water content to an amount between 30% and 40% by weight by filtration and squeezing so as to obtain a panel;
   (f) crushing said panel to form granules;
   (g) drying said granules by gradually heating said granules to a temperature below 100° C.; and
   (h) calcining said dried granules by gradually heating said granules to a temperature of less than 400° C.

2. The process of claim 1 wherein said catalyst consists essentially of molybdenum oxide and iron oxide in a molar ratio of $MoO_3/Fe_2O_3$ of 7.5:1 to 6.0:1.

3. The process of claim 1 wherein the water content in step (e) is reduced to an amount of between 35–38% by weight.

4. The process of claim 1 wherein said granules are calcined at a temperature of between 300–400° C. in the presence of an air flow within the catalyst forming reactor.

5. A process for producing formaldehyde which comprises oxidizing methanol in the presence of a catalyst produced by the process of claim 1.

References Cited

UNITED STATES PATENTS

| | | | |
|---|---|---|---|
| 2,812,309 | 11/1957 | Allyn et al. | 252—470 |
| 2,812,310 | 11/1957 | Walker et al. | 252—470 |
| 3,152,997 | 10/1964 | Natta et al. | 252—470 |

PATRICK P. GARVIN, Primary Examiner

U.S. Cl. X.R.

252—470